(12) United States Patent
Ze-Peng et al.

(10) Patent No.: US 12,623,916 B2
(45) Date of Patent: May 12, 2026

(54) β-TYPE ZINC SULFIDE AND PREPARATION METHOD THEREFOR

(71) Applicant: GUANGDONG XINDA ADVANCED MATERIALS TECHNOLOGY CO., LTD, Heyuan (CN)

(72) Inventors: Lin Ze-Peng, Heyuan (CN); Lin Hua-Xiong, Heyuan (CN); Lin Jun, Heyuan (CN)

(73) Assignee: GUANGDONG XINDA ADVANCED MATERIALS TECHNOLOGY CO., LTD, Heyuan (CN)

( * ) Notice: Subject to any disclaimer, the term of this patent is extended or adjusted under 35 U.S.C. 154(b) by 507 days.

(21) Appl. No.: 18/303,477

(22) Filed: Apr. 19, 2023

(65) Prior Publication Data

US 2023/0271847 A1 Aug. 31, 2023

Related U.S. Application Data

(63) Continuation of application No. PCT/CN2022/130206, filed on Nov. 7, 2022.

(30) Foreign Application Priority Data

Feb. 25, 2022 (CN) .......................... 202210182378.2

(51) Int. Cl.
*C01G 9/08* (2006.01)
(52) U.S. Cl.
CPC ............ *C01G 9/08* (2013.01); *C01P 2004/03* (2013.01); *C01P 2004/04* (2013.01); *C01P 2004/32* (2013.01); *C01P 2004/64* (2013.01)

(58) Field of Classification Search
CPC ....................................................... C01G 9/08
See application file for complete search history.

(56) References Cited

U.S. PATENT DOCUMENTS

2004/0171728 A1* 9/2004 Xue ........................ C08L 51/10
524/425

FOREIGN PATENT DOCUMENTS

| CN | 103752235 A | | 4/2014 |
|----|-------------|---|--------|
| CN | 103803636 A | * | 5/2014 |
| CN | 114455626 A | | 5/2022 |
| JP | 2010143967 A | | 7/2010 |

OTHER PUBLICATIONS

J. Yin et al. "Preparation of ZnS/PS microspheres and ZnS hollow shells," Materials Letters, 2003, 57, 3859-3863. (Year: 2003).*

* cited by examiner

*Primary Examiner* — Paul A Wartalowicz
*Assistant Examiner* — Nicholas A. Piro
(74) *Attorney, Agent, or Firm* — JEEN IP LAW, LLC

(57) ABSTRACT

Disclosed are β-type zinc sulfide and a preparation method therefor. The method includes: adding an oil phase containing styrene monomers into a water phase containing a pore-forming agent, a surfactant, a Zn salt, a complexing agent, a sulfur source and a water-soluble initiator, conducting mixing and emulsification, introducing metal elements, dissolving polystyrene of microspheres prepared through reaction in tetrahydrofuran, and then conducting calcination, pickling and activation to obtain the β-type zinc sulfide. The zinc sulfide microspheres prepared by the present invention are β-type, and have excellent photoelectric properties and broad application prospects.

8 Claims, 2 Drawing Sheets

β-TYPE ZINC SULFIDE AND PREPARATION METHOD THEREFOR

CROSS-REFERENCE TO RELATED APPLICATIONS

The application claims priority to Chinese patent application No. 202210182378.2, filed on Feb. 25, 2022, the entire contents of which are incorporated herein by reference.

TECHNICAL FIELD

The present invention relates to the technical field of zinc sulfide preparation, and particularly relates to β-type zinc sulfide and a preparation method therefor.

BACKGROUND

Zinc sulfide is a group II-IV sulfide semiconductor material with a direct broadband system. At 300 K, it has a forbidden band width Eg=3.647 eV and a corresponding ultraviolet absorption band edge of 340.6 nm. Its effective mass $\mu$ is 0.176 me and its dielectric constant $\varepsilon$ is 8.3 in the Brus formula. With high electroluminescence and photoluminescence efficiency, it is an important matrix material of multi-color fluorescent toner at present. Because of nonlinear optical properties, luminescent properties, quantum size effects and other important physical and chemical properties, the zinc sulfide is widely used in fields, such as various light-emitting apparatuses, laser and infrared detectors, infrared windows and nonlinear optical materials, ceramics, and thermoplastics. An existing production technology is to produce zinc sulfide generally by using purified sphalerite or hydrogen sulfide to react with a Zn salt solution. This kind of production processes are complex, insufficient in reaction, and incomplete in purification and separation, which leads to coarse zinc sulfide particles with an uneven particle size. In practical application, they are low in activity, poor in dispersibility, and likely to agglomerate. In addition, the hydrogen sulfide is highly toxic, and thus causing a huge safety hazard to production and much harm to the environment.

CN107857292A discloses a production line for preparing zinc sulfide, which uses zinc sulfate and hydrogen sulfide gas as reaction raw materials to prepare the zinc sulfide. A preparation method for zinc sulfide uses toxic hydrogen sulfide gas as a reaction raw material, which is very harmful to the environment.

CN102531040A puts forward a process method for preparing multi-spectral ZnS. The process method uses a hot isostatic pressing furnace to process original chemical vapor deposition (CVD) ZnS, so as to obtain a ZnS material with full spectrum transmission. The material has desirable optical properties, but loses desirable mechanical properties of the CVD ZnS material. It has hardness of 156 kg/mm2 and bending strength of 60 MPa, which cannot satisfy strength requirements of guidance systems of high-speed flying weapons for optical windows.

SUMMARY

An objective of the present invention is to provide β-type zinc sulfide and a preparation method therefor. Compared with a traditional method for synthesizing ZnS, the method has fewer steps, mild synthesis conditions, simple and easy operations, and stable morphology control of a synthesized material. An obtained product may be used in polymer resin processing, photovoltaic devices, photocatalysts, gas sensors or other fields. Zinc sulfide microspheres prepared are β-type, and have excellent photoelectric properties and broad application prospects.

A technical solution of the present invention is achieved as follows:

The present invention provides a preparation method for β-type zinc sulfide. The method includes: adding an oil phase containing styrene monomers into a water phase containing a pore-forming agent, a surfactant, a Zn salt, a complexing agent, a sulfur source and a water-soluble initiator, conducting mixing and emulsification, introducing metal elements, dissolving polystyrene of microspheres prepared through reaction in tetrahydrofuran, and then conducting calcination, pickling and activation to obtain the β-type zinc sulfide.

For further improvement to the present invention, the method includes the following steps:

S1. dissolving styrene monomers in an organic solvent, so as to obtain an oil phase;

S2, dissolving a pore-forming agent, a surfactant, a Zn salt, a complexing agent, a sulfur source and a water-soluble initiator in water, so as to obtain a water phase;

S3, adding the oil phase into the water phase, conducting mixing and emulsification, adjusting a pH value, introducing metal elements, conducting heating, stirring and reaction, and conducting centrifugation and washing, so as to obtain porous ZnS/Ps nanospheres;

S4, adding the porous ZnS/Ps nanospheres prepared in S3 into a tetrahydrofuran solvent for reaction, and conducting centrifugation, washing and calcination, so as to obtain porous β-type ZnS nanospheres; and S5, washing the porous β-type ZnS nanospheres by using an acid pickling agent, rinsing the nanospheres by using water to become neutral after washing, and conducting activation and modification by using an activating agent, so as to obtain the β-type zinc sulfide.

For further improvement to the present invention, in S1, the organic solvent is at least one of benzene, methylbenzene, dimethylbenzene, ethylbenzene, ethyl acetate, dichloromethane, methyl acetate, chloroform and carbon tetrachloride; and a content of the styrene monomers in the oil phase is 15 wt %-20 wt %.

For further improvement to the present invention, in S2, the pore-forming agent is a composite pore-forming agent, the composite pore-forming agent includes a macropore-forming agent and a mesopore-forming agent, the macropore-forming agent is selected from at least one of polyoxyethylene sorbitan fatty acid ester, polyethylene glycol octyl phenyl ether, and polyoxyethylene sorbitan fatty acid ester, and the mesopore-forming agent is selected from at least one of cetyltrimethyl ammonium bromide (CTAB), and polyethylene oxide-polypropene oxide triblock copolymers PEO20-PPO70-PEO20 (P123) and PEO106-PPO70-PEO106 (F127). Preferably, the pore-forming agent is a mixture of the polyoxyethylene sorbitan fatty acid ester and the cetyltrimethyl ammonium bromide in a mass ratio of 5:(2-3).

For further improvement to the present invention, in S2, the surfactant is selected from at least one of the sodium dodecyl benzene sulfonate, the sodium dodecyl sulfonate, the sodium dodecyl sulfate, sodium hexadecyl benzene sulfonate, sodium hexadecyl sulfonate, sodium hexadecyl sulfate, sodium octadecyl benzene sulfonate, sodium octadecyl sulfonate, and polyoxyethylene (20) sorbitan monooleate; the Zn salt is selected from at least one of zinc nitrate, zinc sulfate, and zinc chloride; the complexing agent is selected from at least one of citric acid, sodium citrate, polyethylene glycol, ammonia water, tartaric acid, and hydrazine; the sulfur source is selected from at least one of sodium sulfide, potassium sulfide, aluminum sulfide, manganese sulfide, ammonium sulfide, thiourea, and L-cysteine; and the water-soluble initiator is selected from at least one of sodium persulfate, potassium persulfate, and ammonium persulfate.

For further improvement to the present invention, in S2, a mass ratio of the pore-forming agent to the surfactant to the Zn salt to the complexing agent to the sulfur source to the water-soluble initiator is (2-5):(1-3):(30-50):(10-80):(60-100):(0.5-1).

For further improvement to the present invention, in S3, the metal elements are selected from at least one of nickel, lanthanum, cerium, cobalt, titanium, palladium, iridium, platinum, molybdenum, and strontium, an addition amount being 0.01 wt %-0.1 wt % of a total mass of a system; the pH value is adjusted to 8-9, and an emulsification condition is stirring at 12,000 r/min-15,000 r/min for 3 min-5 min; and a heating temperature is 50° C.-70° C., and reaction is conducted for 2 h-5 h.

For further improvement to the present invention, in S4, a solid-liquid ratio of the ZnS/Ps nanospheres to the tetrahydrofuran solvent is 1:(5-10) g/ml, and a calcination condition is calcination at 500° C.-1000° C. for 1 h-6 h.

For further improvement to the present invention, in S5, the acid pickling agent is selected from at least one of sulfuric acid, nitric acid, phosphoric acid, and acetic acid; the activating agent is selected from at least one of sodium dodecyl benzene sulfonate, sodium dodecyl sulfate, sodium dodecyl sulfonate, a silane coupling agent, a titanate coupling agent, triethanolamine, epoxidized soybean oil, isooctanol, isooctanoic acid, castor oil, glyceryl monostearate, and a sorbitan fatty acid ester nonionic surfactant and a polyoxyethylene sorbitan fatty acid ester nonionic surfactant, and the silane coupling agent is selected from at least one of KH550, KH560, KH570, KH580, KH590, KH602, and KH792; the titanate coupling agent is selected from at least one of isopropyl tri (isostearoyl) titanate, isopropyl tri(dioctylphosphonyl) titanate, di(dioctylphosphonyl)oxyacetate titanium, di(dioctylphosphonyl) ethylene titanate, isopropyl di(methacryloyl) isostearoyl titanate, isopropyl tri(dioctylphosphonyl) titanate, isopropyl tri (dodecylbenzenesulfonyl) titanate, and isopropyl tri(n-ethylamino-ethyl-amino) titanate; and a mass ratio of the porous β-type ZnS nanospheres to the activating agent is 100:(2-5).

Preferably, the activating agent is a compound mixture of the sodium dodecyl benzene sulfonate and the silane coupling agent in a mass ratio of 2:(2-5). Through combination and activation of the silane coupling agent and the surfactant, dispersibility and compatibility of β-type zinc sulfide may be greatly improved.

The present invention further protects the β-type zinc sulfide prepared through the preparation method.

The present invention has the following beneficial effects: through a sol-gel method, the present invention mixes and emulsifies the oil phase containing the styrene monomers and the water phase containing the pore-forming agent, the surfactant, the Zn salt, the complexing agent, the sulfur source and the water-soluble initiator, and the oil phase is added into the water phase, so as to form an oil-in-water emulsion; in the water phase, the Zn salt and the sulfur source are used as precursors, then additives such as the complexing agent and the surfactant are added, even mixing is conducted to form a stable sol system, and sol-gel reaction is conducted to form a ZnS shell layer; meanwhile, the polystyrene is synchronously generated as an intermediate template, porous nanospheres with a ZnS/Ps two-layer structure are likely to be generated in a solution due to a formation rate difference between ZnS and a polystyrene template (in the presence of the pore-forming agent), then the polystyrene is washed away by the tetrahydrofuran, and calcination is conducted at 500° C.-1000° C., so as to obtain the porous β-type ZnS nanospheres, which are hollow porous microspheres; and in addition, the present invention introduces the metal elements, so as to catalyze forward reaction between the sulfur source and the Zn salt, such that the prepared β-type zinc sulfide has a complete crystal form and a stable structure, and stability, dispersibility and product coverage of the β-type zinc sulfide in application of modified plastics are improved. Metal sulfide is used to replace the hydrogen sulfide, such that the Zn salt makes a full reaction, and meanwhile, potential safety hazards in production and environmental pollution are reduced. The porous β-type ZnS nanospheres are prepared by introducing the pore-forming agent, which are the porous hollow microspheres, when the nanospheres are added into plastics for modification, resin macromolecules are likely to penetrate pores, and further addition of inorganic β-type zinc sulfide has less influence on mechanical properties of organic plastics; and through activation with the activating agent, dispersibility of β-type zinc sulfide is greatly improved, compatibility with resin is enhanced, and agglomeration is reduced.

Compared with the traditional method for synthesizing ZnS, the method has fewer steps, mild synthesis conditions, simple and easy operations, and stable morphology control of a synthesized material. The obtained product may be used in electrocatalysis, infrared fluorescence, semiconductors, high polymer materials, new energy materials, or other fields. The zinc sulfide microspheres prepared are β-type, and have excellent photoelectric properties and broad application prospects.

BRIEF DESCRIPTION OF DRAWINGS

In order to more clearly describe technical solutions in examples of the present invention or in the prior art, the accompanying drawings required for description of the examples or the prior art will be briefly introduced below. Obviously, the accompanying drawings in the following description are merely some examples of the present invention. Those of ordinary skill in the art would also derive other accompanying drawings from these accompanying drawings without making inventive efforts.

DETAILED DESCRIPTION OF THE EMBODIMENTS

Technical solutions in examples of the present invention will be clearly and completely described below. Apparently, the described examples are merely some rather than all examples of the present invention. All other examples obtained by those of ordinary skill in the art based on the examples of the present invention without creative efforts shall fall within the protection scope of the present invention.

Example 1

Figure 1:
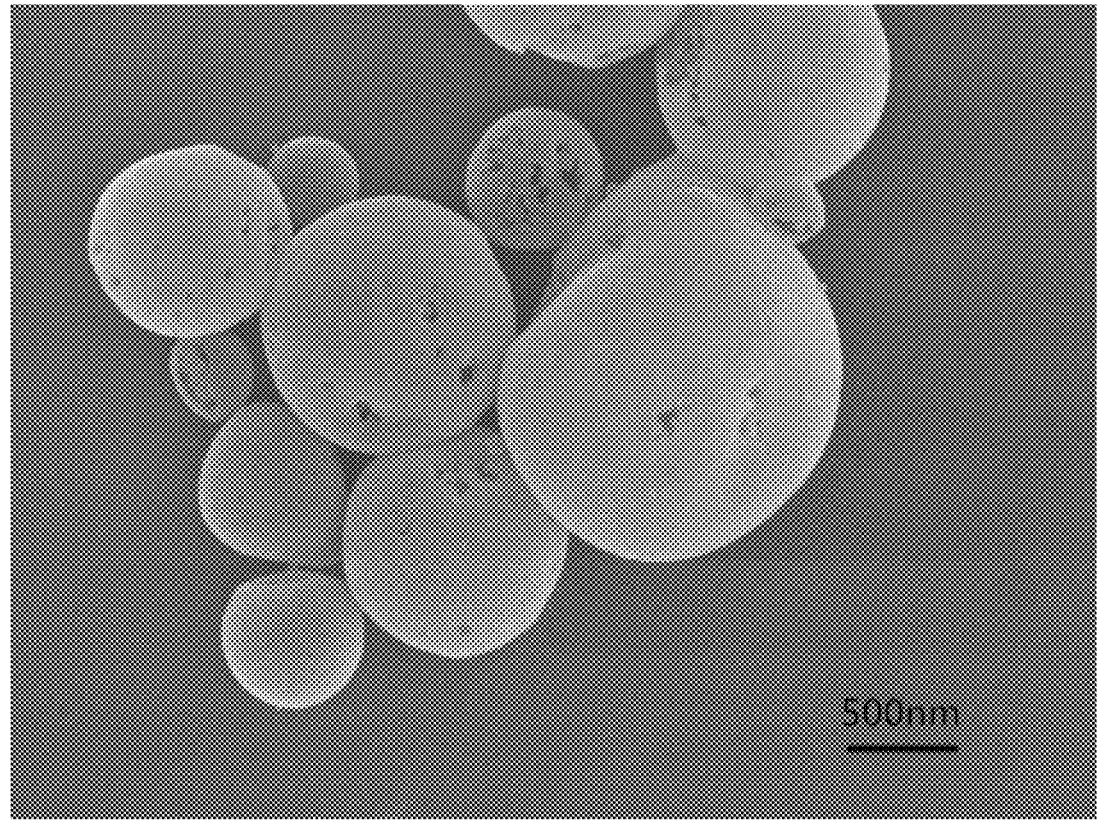
FIG. 1 is a scanning electron microscope (SEM) image of β-type zinc sulfide prepared in Example 1 of the present invention.
Figure 2:
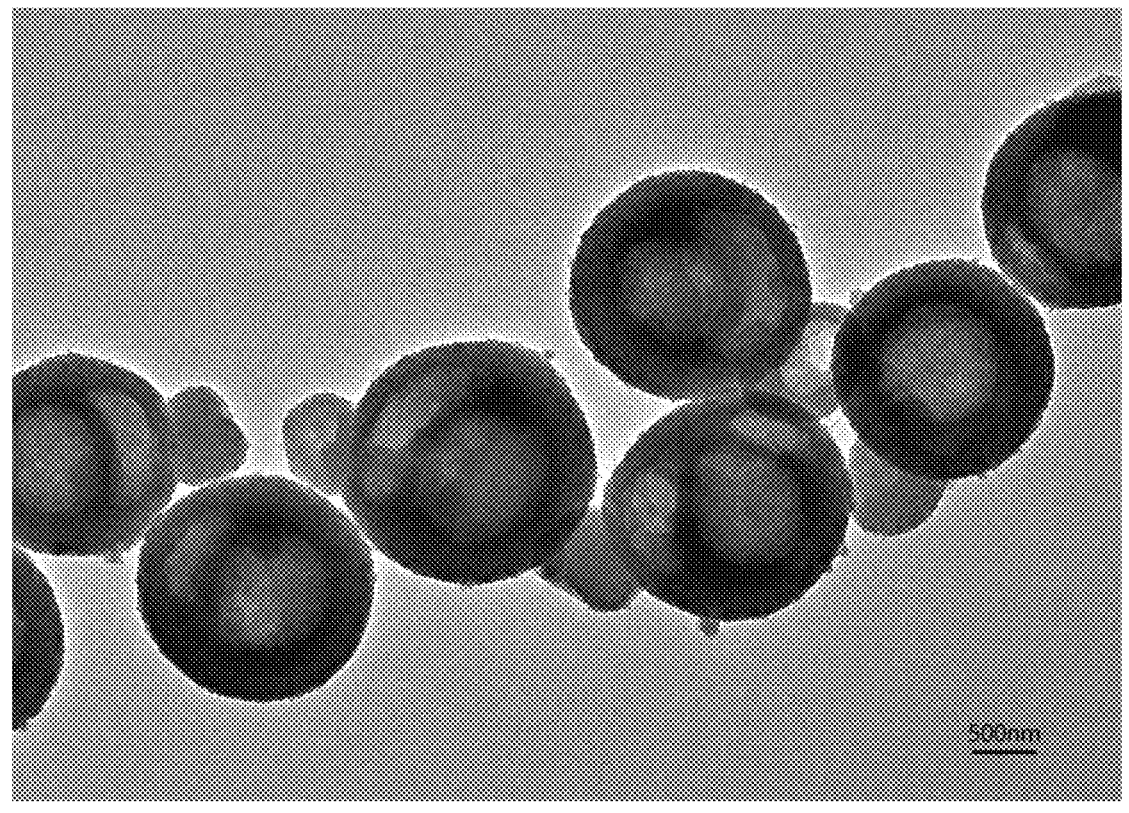
FIG. 2 is a transmission electron microscope (TEM) image of β-type zinc sulfide prepared in Example 1 of the present invention.

The example provides a preparation method for β-type zinc sulfide. The method specifically includes the following steps:

S1, 15 g of styrene monomers was dissolved in 100 mL of ethyl acetate, so as to obtain an oil phase;

S2, 2 g of pore-forming agent, 1 g of sodium hexadecyl sulfate, 30 g of zinc chloride, 10 g of sodium citrate, 60 g of aluminum sulfide and 0.5 g of sodium persulfate were dissolved in 200 mL of water, so as to obtain a water phase, where the pore-forming agent was a mixture of polyoxyethylene sorbitan fatty acid ester and cetyltrimethyl ammonium bromide in a mass ratio of 5:2;

S3, the oil phase was added into the water phase for mixing, emulsification and stirring were conducted at 12,000 r/min for 3 min, a pH value was adjusted to 8, platinum nitrate was added, an addition amount being 0.01 wt % of a total mass of a system, heating was conducted to 50° C., stirring and reaction were conducted for 2 h, centrifugation was conducted at 3,000 r/min for 15 min, and washing was conducted by using deionized water, so as to obtain porous ZnS/Ps nanospheres;

S4, 10 g of porous ZnS/Ps nanospheres prepared in S3 were added into 50 mL of tetrahydrofuran solvent for reaction, centrifugation was conducted at 3,000 r/min for 15 min, washing was conducted by using deionized water, and calcination was conducted at 500° C. for 1 h, so as to obtain porous β-type ZnS nanospheres; and S5, 100 g of porous β-type ZnS nanospheres were washed by using acetic acid and then rinsed by using deionized water to become neutral, filtering was conducted, a filter cake was dried and ground into powder, and activation and modification were conducted by using 2 g of activating agent, so as to obtain the β-type zinc sulfide, where a yield was 92.5%, whiteness was 95, a particle size D97 was 1.8 μm, and the activating agent was a compound mixture of sodium dodecyl benzene sulfonate and a silane coupling agent KH590 in a mass ratio of 2:2. FIG. 1 is a scanning electron microscope (SEM) image of β-type zinc sulfide prepared. It may be seen from the figure that a large number of macropores and mesopores are formed on surfaces of the nanospheres. FIG. 2 is a transmission electron microscope (TEM) image of β-type zinc sulfide prepared. It may be seen from the figure that the nanospheres are of a hollow structure.

Example 2

The example provides a preparation method for β-type zinc sulfide. The method specifically includes the following steps:

S1, 20 g of styrene monomers was dissolved in 100 mL of dimethylbenzene, so as to obtain an oil phase;

S2, 5 g of pore-forming agent, 3 g of polyoxyethylene (20) sorbitan monooleate, 50 g of zinc sulfate, 80 g of tartaric acid, 100 g of thiourea and 1 g of ammonium persulfate were dissolved in 200 mL of water, so as to obtain a water phase, where the pore-forming agent was a mixture of polyoxyethylene sorbitan fatty acid ester and cetyltrimethyl ammonium bromide in a mass ratio of 5:3;

S3, the oil phase was added into the water phase for mixing, emulsification and stirring were conducted at 15,000 r/min for 5 min, a pH value was adjusted to 9, cobalt nitrate was added, an addition amount being 0.1 wt % of a total mass of a system, heating was conducted to 70° C., stirring and reaction were conducted for 5 h, centrifugation was conducted at 3,000 r/min for 15 min, and washing was conducted by using deionized water, so as to obtain porous ZnS/Ps nanospheres;

S4, 10 g of porous ZnS/Ps nanospheres prepared in S3 were added into 100 mL of tetrahydrofuran solvent for reaction, centrifugation was conducted at 3,000 r/min for 15 min, washing was conducted by using deionized water, and calcination was conducted at 1000° C. for 6 h, so as to obtain porous β-type ZnS nanospheres; and S5, 100 g of porous β-type ZnS nanospheres were washed by using phosphoric acid and then rinsed by using deionized water to become neutral, filtering was conducted, a filter cake was dried and ground into powder, and activation and modification were conducted by using 5 g of activating agent, so as to obtain the β-type zinc sulfide, where a yield was 93.7%, whiteness was 96, a particle size D97 was 1.7 μm, and the activating agent was a compound mixture of sodium dodecyl benzene sulfonate and a silane coupling agent KH570 in a mass ratio of 2:5.

Example 3

The example provides a preparation method for β-type zinc sulfide. The method specifically includes the following steps:

S1, 17 g of styrene monomers was dissolved in 100 mL of methylbenzene, so as to obtain an oil phase;

S2, 3.5 g of pore-forming agent, 2 g of sodium dodecyl benzene sulfonate, 40 g of zinc nitrate, 50 g of citric acid, 80 g of sodium sulfide and 0.7 g of potassium persulfate were dissolved in 200 ml of water, so as to obtain a water phase, where the pore-forming agent was a mixture of polyoxyethylene sorbitan fatty acid ester and cetyltrimethyl ammonium bromide in a mass ratio of 5:2.5;

S3, the oil phase was added into the water phase for mixing, emulsification and stirring were conducted at 13,500 r/min for 4 min, a pH value was adjusted to 8.5, platinum nitrate was added, an addition amount being 0.05 wt % of a total mass of a system, heating was conducted to 60° C., stirring and reaction were conducted for 3.5 h, centrifugation was conducted at 3,000 r/min for 15 min, and washing was conducted by using deionized water, so as to obtain porous ZnS/Ps nanospheres;

S4, 10 g of porous ZnS/Ps nanospheres prepared in S3 were added into 70 mL of tetrahydrofuran solvent for reaction, centrifugation was conducted at 3,000 r/min for 15 min, washing was conducted by using deionized water, and calcination was conducted at 750° C. for 3 h, so as to obtain porous β-type ZnS nanospheres; and S5, 100 g of porous β-type ZnS nanospheres were washed by using sulfuric acid of 2 mol/L and then rinsed by using deionized water to become neutral, filtering was conducted, a filter cake was dried and ground into powder, and activation and modification were conducted by using 3.5 g of activating agent, so as to obtain the β-type zinc sulfide, where a yield was 94.2%, whiteness was 97, a particle size D97 was 1.5 μm, and the activating agent was a compound mixture of sodium dodecyl benzene sulfonate and a silane coupling agent KH550 in a mass ratio of 2:3.

Example 4

Compared with Example 3, the example used sodium dodecyl benzene sulfonate as an activating agent, and did not change the other conditions. Obtained β-type zinc sulfide had a yield of 93.5%, whiteness of 92, and a particle size D97 of 2.0 μm.

Example 5

Compared with Example 3, the example used a silane coupling agent KH550 as an activating agent, and did not change the other conditions. Obtained β-type zinc sulfide had a yield of 93.1%, whiteness of 91, and a particle size D97 of 2.1 μm.

Example 6

Compared with Example 3, the example used polyoxyethylene sorbitan fatty acid ester as a pore-forming agent, and did not change the other conditions. Obtained β-type zinc sulfide had a yield of 92.9%, whiteness of 87, and a particle size D97 of 2.2 μm.

Example 7

Compared with Example 3, the example used cetyltrimethyl ammonium bromide as a pore-forming agent, and did not change the other conditions. Obtained β-type zinc sulfide had a yield of 92.7%, whiteness of 88, and a particle size D97 of 2.1 μm.

Comparative Example 1

Compared with Example 3, the example added no pore-forming agent, and did not change the other conditions.

Specifically, the example included the following steps:

S1, 17 g of styrene monomers was dissolved in 100 mL of methylbenzene, so as to obtain an oil phase;

S2, 5.5 g of sodium dodecyl benzene sulfonate, 40 g of zinc nitrate, 50 g of citric acid, 80 g of sodium sulfide and 0.7 g of potassium persulfate were dissolved in 200 mL of water, so as to obtain a water phase;

S3, the oil phase was added into the water phase for mixing, emulsification and stirring were conducted at 13,500 r/min for 4 min, a pH value was adjusted to 8.5, platinum nitrate was added, an addition amount being 0.05 wt % of a total mass of a system, heating was conducted to 60° C., stirring and reaction were conducted for 3.5 h, centrifugation was conducted at 3,000 r/min for 15 min, and washing was conducted by using deionized water, so as to obtain ZnS/Ps nanospheres;

S4, 10 g of ZnS/Ps nanospheres prepared in S3 were added into 70 mL of tetrahydrofuran solvent for reaction, centrifugation was conducted at 3,000 r/min for 15 min, washing was conducted by using deionized water, and calcination was conducted at 750° C. for 3 h, so as to obtain β-type ZnS nanospheres; and S5, 100 g of β-type ZnS nanospheres were washed by using sulfuric acid of 2 mol/L and then rinsed by using deionized water to become neutral, filtering was conducted, a filter cake was dried and ground into powder, and activation and modification were conducted by using 3.5 g of activating agent, so as to obtain the β-type zinc sulfide, where a yield was 92.4%, whiteness was 85, a particle size D97 was 2.0 μm, and the activating agent was a compound mixture of sodium dodecyl benzene sulfonate and a silane coupling agent KH550 in a mass ratio of 2:3.

Comparative Example 2

Compared with Example 3, the example added no platinum nitrate, and did not change the other conditions.

Specifically, the example included the following steps:

S1, 17 g of styrene monomers was dissolved in 100 mL of methylbenzene, so as to obtain an oil phase;

S2, 3.5 g of pore-forming agent, 2 g of sodium dodecyl benzene sulfonate, 40 g of zinc nitrate, 50 g of citric acid, 80 g of sodium sulfide and 0.7 g of potassium persulfate were dissolved in 200 mL of water, so as to obtain a water phase, where the pore-forming agent was a mixture of polyoxyethylene sorbitan fatty acid ester and cetyltrimethyl ammonium bromide in a mass ratio of 5:2.5;

S3, the oil phase was added into the water phase for mixing, emulsification and stirring were conducted at 13,500 r/min for 4 min, a pH value was adjusted to 8.5, heating was conducted to 60° C., stirring and reaction were conducted for 3.5 h, centrifugation was conducted at 3,000 r/min for 15 min, and washing was conducted by using deionized water, so as to obtain porous ZnS/Ps nanospheres;

S4, 10 g of porous ZnS/Ps nanospheres prepared in S3 were added into 70 mL of tetrahydrofuran solvent for reaction, centrifugation was conducted at 3,000 r/min for 15 min, washing was conducted by using deionized water, and calcination was conducted at 750° C. for 3 h, so as to obtain porous β-type ZnS nanospheres; and S5, 100 g of porous β-type ZnS nanospheres were washed by using sulfuric acid of 2 mol/L and then rinsed by using deionized water to become neutral, filtering was conducted, a filter cake was dried and ground into powder, and activation and modification were conducted by using 3.5 g of activating agent, so as to obtain the β-type zinc sulfide, where a yield was 67.2%, whiteness was 86, a particle size D97 was 3.0 μm, and the activating agent was a compound mixture of sodium dodecyl benzene sulfonate and a silane coupling agent KH550 in a mass ratio of 2:3.

Comparative Example 3

Compared with Example 3, the example added no activating agent, and did not change the other conditions.

Specifically, the example included the following steps:

S1, 17 g of styrene monomers was dissolved in 100 mL of methylbenzene, so as to obtain an oil phase;

S2, 3.5 g of pore-forming agent, 2 g of sodium dodecyl benzene sulfonate, 40 g of zinc nitrate, 50 g of citric acid, 80 g of sodium sulfide and 0.7 g of potassium persulfate were dissolved in 200 mL of water, so as to obtain a water phase, where the pore-forming agent was a mixture of polyoxyethylene sorbitan fatty acid ester and cetyltrimethyl ammonium bromide in a mass ratio of 5:2.5;

S3, the oil phase was added into the water phase for mixing, emulsification and stirring were conducted at 13,500 r/min for 4 min, a pH value was adjusted to 8.5, platinum nitrate was added, an addition amount being 0.05 wt % of a total mass of a system, heating was conducted to 60° C., stirring and reaction were conducted for 3.5 h, centrifugation was conducted at 3,000 r/min for 15 min, and washing was conducted by using deionized water, so as to obtain porous ZnS/Ps nanospheres;

S4, 10 g of porous ZnS/Ps nanospheres prepared in S3 were added into 70 mL of tetrahydrofuran solvent for reaction, centrifugation was conducted at 3,000 r/min for 15 min, washing was conducted by using deionized water, and calcination was conducted at 750° C. for 3 h, so as to obtain porous β-type ZnS nanospheres; and S5, 100 g of porous β-type ZnS nanospheres were washed by using sulfuric acid of 2 mol/L and then rinsed by using deionized water to become neutral, filtering was conducted, and a filter cake was dried and ground into powder, so as to obtain β-type zinc sulfide, where a yield was 91.7%, whiteness was 89, and a particle size D97 was 2.0 μm.

Comparative Example 4

Specifically, the example included the following steps:

3.5 g of pore-forming agent, 2 g of sodium dodecyl benzene sulfonate, 40 g of zinc nitrate, 50 g of citric acid and 80 g of sodium sulfide were dissolved in 200 mL of water, a pH value was adjusted to 8.5, platinum nitrate was added, an addition amount being 0.05 wt % of a total mass of a system, heating was conducted to 60° C., stirring and reaction were conducted for 3.5 h, centrifugation was conducted at 3,000 r/min for 15 min, and washing was conducted by using deionized water, so as to obtain a porous ZnS material; and 100 g of porous ZnS material was washed by using sulfuric acid of 2 mol/L and then rinsed by using deionized water to become neutral, filtering was conducted, a filter cake was dried and ground into powder, and activation and modification were conducted by using 3.5 g of activating agent, so as to obtain the β-type zinc sulfide, where a yield was 88.5%, whiteness was 92, and a particle size D97 was 4.0 μm.

The activating agent was a compound mixture of the sodium dodecyl benzene sulfonate and a silane coupling agent KH550 in a mass ratio of 2:3. The pore-forming agent was a mixture of polyoxyethylene sorbitan fatty acid ester and cetyltrimethyl ammonium bromide in a mass ratio of 5:2.5.

Test Example 1

Photocatalytic properties of β-type zinc sulfide prepared in Examples 1-7 and β-type zinc sulfide prepared in Comparative Examples 1-4 were tested, and results were shown in Table 1.

A methylene blue solution with an initial concentration of $1 \times 10^{-4}$ mol/L was prepared by using a volumetric flask, 10 mg of prepared β-type zinc sulfide was added into 50 mL of methylene blue solution, conducting ultrasonic processing for 3 min so as to enable ZnS samples to be evenly dispersed in the methylene blue solution and form a stable suspension, stirring was conducted for 15 min so as to enable methylene blue to reach adsorption equilibrium on a surface of β-type zinc sulfide, irradiation was conducted by using an ultraviolet lamp so as to make a photocatalytic reaction for 30 min, 5 mL of mixed solution was taken in a centrifuge tube by using a syringe, absorbance of the solution was tested, and a degradation rate of the solution was computed according to a computation formula as follows:

Degradation rate $(\%)=(A_0-A_1)/A_0*100\%$.

$A_0$ was an absorbance value of an initial methylene blue solution; and $A_1$ was an absorbance value of the processed methylene blue solution.

TABLE 1

| Group | Degradation rate (%) |
|---|---|
| Example 1 | 94.5 |
| Example 2 | 95.2 |
| Example 3 | 96.4 |
| Example 4 | 93.5 |
| Example 5 | 93.1 |
| Example 6 | 88.9 |
| Example 7 | 89.1 |
| Comparative Example 1 | 85.3 |
| Comparative Example 2 | 87.5 |
| Comparative Example 3 | 93.0 |
| Comparative Example 4 | 86.4 |

It may be seen from the above table, the β-type zinc sulfide prepared in Examples 1-3 of the present invention had high photocatalytic efficiency, such that a degradation rate of methylene blue was high within 30 min.

Test Example 2

5 g of β-type zinc sulfide prepared in Examples 1-7 and Comparative Examples 1-4 and 100 g of polypropylene (PP) resin (purchased from the Nan Ya Company in Taiwan, with a model pp 3317) were added into a double-screw extruder, heating was conducted to 170° C., melting, stirring and mixing were conducted for 2 h, then extrusion and granulation were conducted, modified PP was obtained and cut into dumbbell-shaped tensile samples, the dumbbell-shaped tensile samples were stretched at a constant speed of 50 mm/min according to GB/T1040.2-2006, properties of the modified PP were tested, and results were shown in Table 2.

TABLE 2

| Group | Tensile strength (MPa) | Elongation at break (%) |
|---|---|---|
| Example 1 | 26.2 | 470 |
| Example 2 | 26.4 | 474 |
| Example 3 | 27.2 | 482 |
| Example 4 | 23.5 | 457 |
| Example 5 | 23.1 | 452 |
| Example 6 | 22.9 | 435 |
| Example 7 | 23.0 | 432 |
| Comparative Example 1 | 21.5 | 412 |
| Comparative Example 2 | 23.4 | 450 |
| Comparative Example 3 | 22.5 | 445 |
| Comparative Example 4 | 20.7 | 402 |

It may be seen from the above table that the β-type zinc sulfide prepared in Examples 1-3 of the present invention had less influence on mechanical properties of PP resin after being added into the PP resin for modification.

Compared with Example 3, Examples 4 and 5 used sodium dodecyl benzene sulfonate or a silane coupling agent KH550 as an activating agent, and mechanical properties of the material were decreased after the β-type zinc sulfide was added into the PP resin for modification. Compared with Example 3, Comparative Example 3 added no activating agent, and mechanical properties were obviously decreased. Through activation with the activating agent, dispersibility of β-type zinc sulfide was greatly improved, compatibility with resin was enhanced, and agglomeration was reduced. Through combination and activation of the silane coupling agent and a surfactant, dispersibility and compatibility of the β-type zinc sulfide may be greatly improved, resulting in less influence on the mechanical properties of the resin.

Compared with Example 3, Examples 6 and 7 used polyoxyethylene sorbitan fatty acid ester or cetyltrimethyl ammonium bromide as a pore-forming agent, whiteness was decreased, and after the β-type zinc sulfide was added into PP resin for modification, mechanical properties and photocatalytic degradation properties of the material were decreased. Compared with Example 3, Comparative Example 1 added no pore-forming agent, whiteness was obviously decreased, mechanical properties and photocatalytic degradation properties were obviously decreased, porous-type ZnS nanospheres were prepared by introducing the pore-forming agent, which were porous hollow microspheres, when the nanospheres were added into plastics for modification, resin macromolecules were likely to penetrate pores, and further addition of inorganic β-type zinc sulfide had less influence on mechanical properties of organic plastics. In addition, the pore-forming agent, especially a mesopore-forming agent, was introduced, such that a specific surface area of nanospheres was obviously increased, photocatalytic activity was improved, and further an active function of nano-β-type zinc sulfide was enhanced.

Compared with Example 3, Comparative Example 2 added no platinum nitrate, such that a yield was decreased, whiteness was decreased, a particle size was increased, and photocatalytic properties and mechanical properties of the material added into PP resin for modification were decreased. The present invention introduced the metal elements, so as to catalyze forward reaction between the sulfur source and the Zn salt, such that the prepared β-type zinc sulfide had a complete crystal form and a stable structure, and stability, dispersibility and product coverage of the β-type zinc sulfide in application of modified plastics were improved.

Comparative Example 4 did not prepare β-type zinc sulfide nanospheres of a hollow structure, and mechanical properties and photocatalytic degradation properties of the material were decreased after β-type zinc sulfide was added into PP resin for modification. The porous β-type ZnS nanospheres were prepared, which were porous hollow microspheres, when the nanospheres were added into plastics for modification, the resin macromolecules were likely to penetrate pores, and further addition of inorganic β-type zinc sulfide had less influence on mechanical properties of organic plastics. In this way, agglomeration of nano particles was avoided, the specific surface area of β-type zinc sulfide was increased, and further photocatalytic activity was improved.

The above description is merely the preferred examples of the present invention, and not intended to limit the present invention. Any modifications, equivalent replacements, improvements, etc. made within the spirit and principle of the present invention should fall within the protection scope of the present invention.

What is claimed is:

1. A preparation method for β-type zinc sulfide, comprising the following steps:

S1, dissolving styrene monomers in an organic solvent, so as to obtain an oil phase;

S2, dissolving a pore-forming agent, a surfactant, a Zn salt, a complexing agent, a sulfur source and a water-soluble initiator in water, so as to obtain a water phase, wherein the pore-forming agent is a composite pore-forming agent, the composite pore-forming agent comprises a macropore-forming agent and a mesopore-forming agent, the macropore-forming agent is selected from at least one of polyoxyethylene sorbitan fatty acid ester, polyethylene glycol octyl phenyl ether, and polyoxyethylene sorbitan fatty acid ester, and the mesopore-forming agent is cetyltrimethyl ammonium bromide (CTAB);

S3, adding the oil phase into the water phase, conducting mixing and emulsification, adjusting a pH value to 8-9, introducing metal elements, heating to 50° C.-70° C., stirring and conducting reaction for 2 h-5 h, and conducting centrifugation and washing, so as to obtain porous ZnS/PS nanospheres, wherein the metal elements are selected from at least one of nickel, lanthanum, cerium, cobalt, titanium, palladium, iridium, platinum, molybdenum, and strontium, and wherein the total amount of the metal elements added is 0.01 wt % to 0.1 wt % based on a total mass of a system;

S4, adding the porous ZnS/PS nanospheres prepared in S3 into a tetrahydrofuran solvent for reaction, and conducting centrifugation, washing and calcination, so as to obtain porous β-type ZnS nanospheres; and S5, washing the porous β-type ZnS nanospheres by using an acid pickling agent, rinsing the nanospheres by using water to become neutral after washing, and conducting activation and modification by using an activating agent, so as to obtain the β-type zinc sulfide that has been activated and modified with the activating agent, wherein the acid pickling agent is selected from at least one of sulfuric acid, nitric acid, phosphoric acid, and acetic acid, and the activating agent is selected from at least one of sodium dodecyl benzene sulfonate, sodium dodecyl sulfate, sodium dodecyl sulfonate, a silane coupling agent, a titanate coupling agent, triethanolamine, epoxidized soybean oil, isooctanol, isooctanoic acid, castor oil, glyceryl monostearate, and a sorbitan fatty acid ester nonionic surfactant and a polyoxyethylene sorbitan fatty acid ester nonionic surfactant.

2. The preparation method according to claim 1, wherein in S1, the organic solvent is at least one of benzene, methylbenzene, dimethylbenzene, ethylbenzene, ethyl acetate, dichloromethane, methyl acetate, chloroform and carbon tetrachloride; and a content of the styrene monomers in the oil phase is 15 wt %-20 wt %.

3. The preparation method according to claim 1, wherein in S2, the pore-forming agent is a mixture of the polyoxyethylene sorbitan fatty acid ester and the cetyltrimethyl ammonium bromide in a mass ratio of 5:(2-3).

4. The preparation method according to claim 1, wherein in S2, the surfactant is selected from at least one of the sodium dodecyl benzene sulfonate, the sodium dodecyl sulfonate, the sodium dodecyl sulfate, sodium hexadecyl benzene sulfonate, sodium hexadecyl sulfonate, sodium hexadecyl sulfate, sodium octadecyl benzene sulfonate, sodium octadecyl sulfonate, and polyoxyethylene (20) sorbitan monooleate; the Zn salt is selected from at least one of zinc nitrate, zinc sulfate, and zinc chloride; the complexing agent is selected from at least one of citric acid, sodium citrate, polyethylene glycol, ammonia water, tartaric acid, and hydrazine; the sulfur source is selected from at least one of sodium sulfide, potassium sulfide, aluminum sulfide, manganese sulfide, ammonium sulfide, thiourea, and L-cysteine; and the water-soluble initiator is selected from at least one of sodium persulfate, potassium persulfate, and ammonium persulfate.

5. The preparation method according to claim 1, wherein in S2, a mass ratio of the pore-forming agent to the surfactant to the Zn salt to the complexing agent to the sulfur source to the water-soluble initiator is (2-5):(1-3):(30-50): (10-80):(60-100):(0.5-1).

6. The preparation method according to claim 1, wherein in S3, an emulsification condition is stirring at 12,000 r/min-15,000 r/min for 3 min-5 min.

7. The preparation method according to claim 1, wherein in S4, a solid-liquid ratio of the ZnS/PS nanospheres to the tetrahydrofuran solvent is 1:(5-10) g/ml, and a calcination condition is calcination at 500° C.-1000° C. for 1 h-6 h.

8. The preparation method according to claim 1, wherein in S5, the silane coupling is selected from at least one of 3-aminopropyltriethoxysilane, 3-glycidoxypropyltrimethoxysilane, 3-methacryloxypropyltrimethoxysilane, 3-mercaptopropyltrimethoxysilane, 3-mercaptopropyltriethoxysilane, 3-(2-aminoethylamino) propyl-dimethoxymethylsilane, and N-[3-(trimethoxysilyl) propyl]ethylenediamine; the titanate coupling agent is selected from at least one of isopropyl tri(isostearoyl) titanate, isopropyl tri(dioctylphosphonyl) titanate, di(dioctylphosphonyl)oxyacetate titanium, di(dioctylphosphonyl)ethylene titanate, isopropyl di(methacryloyl) isostearoyl titanate, isopropyl tri(dioctylphosphonyl) titanate, isopropyl tri (dodecylbenzenesulfonyl) titanate, and isopropyl tri(n-ethylanino-ethylamino) titanate; and a mass ratio of the porous p-type ZnS nanospheres to the activating agent is 100:(2-5).

\*   \*   \*   \*   \*